United States Patent
Wilenski (10) Patent No.: US 12,261,636 B2
(45) Date of Patent: Mar. 25, 2025

(54) WIRELESS DATA TRANSMISSION SYSTEMS, AND RELATED DEVICES AND METHODS

(71) Applicant: INTELLISERV, LLC, Houston, TX (US)

(72) Inventor: Thomas Wilenski, American Fork, UT (US)

(73) Assignee: INTELLISERV, LLC, Houston, TX (US)

( * ) Notice: Subject to any disclaimer, the term of this patent is extended or adjusted under 35 U.S.C. 154(b) by 0 days.

(21) Appl. No.: 17/551,658

(22) Filed: Dec. 15, 2021

(65) Prior Publication Data

US 2023/0188167 A1   Jun. 15, 2023

(51) Int. Cl.
   *H04B 1/02* (2006.01)
   *H04B 7/06* (2006.01)

(52) U.S. Cl.
   CPC ............ *H04B 1/02* (2013.01); *H04B 7/0617* (2013.01)

(58) Field of Classification Search
   CPC ................................. H04B 1/02; H04B 7/0617
   See application file for complete search history.

(56) References Cited

U.S. PATENT DOCUMENTS

| | | | |
|---|---|---|---|
| 4,785,247 A * | 11/1988 | Meador | G01V 3/28 324/338 |
| 7,139,218 B2 | 11/2006 | Hall et al. | |
| 7,224,288 B2 | 5/2007 | Hall et al. | |
| 8,889,347 B2 | 11/2014 | Roth et al. | |
| 8,899,347 B2 | 12/2014 | Sarhad et al. | |
| 11,264,999 B2 * | 3/2022 | Jennings | H03L 7/181 |
| 2004/0145970 A1 * | 7/2004 | Dopf | E21B 47/16 340/856.3 |
| 2006/0065395 A1 * | 3/2006 | Snell | E21B 47/01 175/45 |
| 2007/0062692 A1 * | 3/2007 | Estevez | H04L 67/12 166/250.01 |
| 2010/0271233 A1 | 10/2010 | Li et al. | |
| 2012/0080227 A1 | 4/2012 | Cardellini et al. | |
| 2015/0192004 A1 * | 7/2015 | Saeedfar | E21B 47/13 166/57 |
| 2017/0321484 A1 * | 11/2017 | Dewald | G01L 5/0061 |
| 2019/0101663 A1 * | 4/2019 | Walters | G01V 1/52 |
| 2019/0379114 A1 * | 12/2019 | Nguyen | H01Q 7/00 |
| 2021/0208103 A1 * | 7/2021 | Hill, III | G01N 27/9006 |

OTHER PUBLICATIONS

NanoStation AC Datasheet, 5GHz AirMAX® AC Radio, Models:NS-SAC Loco 5 AC, Ubiquiti® AirMAX AC Processor, Dedicated WI-FI radio for management, Ubiquiti Networks 5 pages.
International Search Report and Written issued in International Patent Application No. PCT/US22/81336, dated Mar. 10, 2023.

* cited by examiner

*Primary Examiner* — Amine Benlagsir
(74) *Attorney, Agent, or Firm* — JONES ROBB, PLLC (57) ABSTRACT

A system for communicating information about a drilling operation comprises a drill string comprising a bottom-hole assembly, a data transmission line operably coupled to the bottom-hole assembly to receive data relating to the drilling operation, and a wireless transmission system operably coupled to the data transmission line and configured to receive and relay the data from the data transmission line. The wireless transmission system comprises a wireless transmitter comprising a beam forming antenna array. Devices and methods relate to communicating information about a drilling operation.

21 Claims, 9 Drawing Sheets

WIRELESS DATA TRANSMISSION SYSTEMS, AND RELATED DEVICES AND METHODS

TECHNICAL FIELD

Aspects of the present disclosure relate to wireless data transmission systems, and related devices and methods. In particular, wireless data transmission for use in oil and gas drilling operations are disclosed.

INTRODUCTION

The oil and gas industry has sought to develop downhole telemetry systems that enable high-definition formation evaluation and borehole navigation while drilling in real time. The ability to transmit to the surface large amounts of sub-surface data obtained while drilling has the potential to significantly decrease drilling costs by enabling operators to more accurately direct the drill string to locations of desired deposits (e.g., hydrocarbon, etc.). Such information may also improve safety and reduce the environmental impacts of drilling. This technology may also be desirable to take advantage of numerous advances in the design of tools and techniques for oil and gas exploration, and may be used to provide real-time access to data such as temperature, pressure, inclination, salinity, and the like, while drilling.

To transmit data at high speeds along a drill string, various approaches have been considered. One approach is to incorporate data transmission lines, or wires, into drill string components to bi-directionally transmit data along the drill string. For example, drill string components can include high-speed, high-strength data cable running through the central bores of these components. In certain cases, this approach uses repeaters or amplifiers placed at selected intervals along the drill string to amplify or boost the signal as it travels along the transmission lines.

Data transmitted up the rotating drill string must be transmitted to a surface computer associated with the drilling rig, such as a network controller configured to receive the data from the downhole telemetry system and further process and/or transmit the data to on-site or remote locations for further analysis and/or viewing by rig operators. To accomplish the transfer of data from the transmission line(s) in the rotating drill string to stationary parts of the rig, a rotating electronic coupler called a swivel may be used. The swivel includes rotating components that rotate with the drill string and stationary components coupled to surface cabling that ultimately connect to the network controller. Rotatable magnetic couplers within the swivel operably couple the transmission line(s) of the drill string with the surface cabling.

The surface cabling from the swivel to the network controller can be relatively complex and may require multiple junction boxes and different types of cabling. In addition, incorrect installation of the surface cabling can result in grounding and/or shielding issues, signal loss, and other problems that can impact data transfer speed and integrity. In addition, the drilling rig is an electrically "noisy" environment due to elements such as the high-speed rotating equipment, such as top drive units. This complicates the ability to achieve strong signal transmission. Further, any noise and signal integrity issues resulting from improper cabling installation can be exacerbated.

It is desired to provide a system for transmitting data from the data transmission line of the drill string to a stationary surface location without the complexity and margin for error introduced by the surface cabling arrangement. In addition, it is desired to provide a system that reduces possibility for errors in installation and the associated potential signal degradation. It is further desired to provide such a system that can be adapted to existing drill string and rig hardware.

SUMMARY

Embodiments of the present disclosure may solve one or more of the above-mentioned problems and/or may demonstrate one or more of the above-mentioned desirable features. Other features and/or advantages may become apparent from the description that follows.

In accordance with at least one aspect of the present disclosure, a system for communicating information about a drilling operation comprises a drill string comprising a bottom-hole assembly, a data transmission line operably coupled to the bottom-hole assembly to receive data relating to the drilling operation, and a wireless transmission system operably coupled to the data transmission line and configured to receive and relay the data from the data transmission line. The wireless transmission system comprises a wireless transmitter comprising a beam forming antenna array. Devices and methods relate to communicating information about a drilling operation.

In another aspect of the present disclosure, an assembly configured to be coupled to a drill string comprises a housing defining a receptacle having a closed end portion facing radially inward relative to a longitudinal axis of the housing, an open end portion facing radially outward relative to the longitudinal axis, and sidewall portions between the closed end and the open end, a communications coupler configured to be communicatively coupled to a data transmission line of a drill string, and a wireless transmitter in the receptacle. The housing is configured to shield transmission of electromagnetic energy from the wireless transmitter through the closed end portion and sidewall portions.

In yet another aspect of the present disclosure, a method of transmitting data from a drill string comprises transmitting data from a drilling operation along a data transmission line from a bottom-hole assembly attached to a drill string, and wirelessly transmitting the data from the data transmission line to a wireless receiver via a wireless transmitter using beam forming radio frequency transmission.

Additional objects, features, and/or advantages will be set forth in part in the description which follows, and in part will be obvious from the description, or may be learned by practice of the present disclosure and/or claims. At least some of these objects and advantages may be realized and attained by the elements and combinations particularly pointed out in the appended claims.

It is to be understood that both the foregoing general description and the following detailed description are for example and explanatory only and are not restrictive of the claims; rather the claims should be entitled to their full breadth of scope, including equivalents.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more embodiments of the present teachings and together with the description explain certain principles and operation. In the drawings.

DETAILED DESCRIPTION

Embodiments of the present disclosure relate to wireless data transmission systems that facilitate transfer of data wirelessly from a wired drill string to a drilling rig network controller. The system can include a drill string comprised of a series of drill pipe sections, and a downhole assembly, such as a bottom-hole assembly (BHA) including one or more tools, coupled to an end of the drill string. Each of the drill pipe sections can include a data transmission line. Communications between the drill pipe sections, and thus along the drill string from the BHA to the surface, can be enabled by communicatively coupling the sections of data transmission line in each drill pipe section. In an embodiment, the data transmission line sections are coupled in series via communications couplers provided proximate each end of the drill pipe sections. Such couplers can include direct or galvanic contacts, inductive couplers, current couplers, optical couplers, or other types of communications couplers.

The drill string may be coupled at an end thereof opposite the BHA to a rotary drive component used in a drilling system, such as, for example, a top drive unit. A portion of the drill string coupled to the top drive, or another component interposed between the drill string and the top drive, such as a saver sub, includes a radio-frequency (RF) device, such as a wireless transmitter (which may be, e.g., a wireless transceiver). The RF device can be operably coupled to a communication link, which can in turn be operably coupled to the series of data transmission lines of the drill string. The communication link can be configured to amplify, filter, convert, or otherwise manipulate data received from the BHA via the data transmission lines. In some embodiments, a data converter, such as an additional processor, can optionally be operably coupled between the communication link and the RF device to further refine, convert, or otherwise manipulate data received from the communication link. The data converter can optionally be in the form of a single board computer or other processing device.

The wireless transmitter can be housed in a structure that provides electromagnetic shielding along one or more sides to partially shield the wireless transmitter and thereby result in a directionality in its transmission. For example, the wireless transmitter can be shielded at least above and below the wireless transmitter with respect to a longitudinal axis of the drill string. In some embodiments, the wireless transmitter can be housed in an electrically conductive structure that forms a Faraday cage around a portion of the wireless transmitter. In one embodiment, the housing is a portion of a saver sub assembly, and the wireless transmitter is unshielded on a side facing radially outward from the saver sub while being shielded in other directions so as to result in a radially outward directionality of the transmitted signals from the wireless transmitter.

In some embodiments, the wireless transmitter comprises a wireless gateway with one or more antennas that comprise beam forming and/or beam steering (i.e., dynamically changing the radiation pattern from the antenna(s)) capabilities. For example, in one embodiment, the wireless transmitter comprises a phased antenna array. In various embodiments, the phased antenna array can comprise a four-element phased array antenna, and the wireless transmitter can be configured to provide beam forming capabilities via the physical configuration of the antenna elements. While the embodiment discussed herein can have a four-element antenna array, other numbers of antennas could be used based on factors such as transmission power, desired transmission distance, and the desired radiation pattern. Additionally or alternatively, beam forming capabilities can be achieved using negative index arrays, apertures, or other physical configurations. Additionally, the wireless transmitter can provide beam steering capabilities via phase shifting of the signal using, e.g., phasors and/or phase lock loop circuits coupled to each antenna of the array.

The wireless transmitter is configured to communicate via RF signals with an wireless receiver (which can be, for example, a wireless transceiver) operably coupled with a surface computer associated with the rig operation, such as a network controller configured to receive the data from the downhole telemetry system and further process and/or transmit the data to on-site or remote locations for further analysis and/or viewing, such as by rig operators. In some embodiments, the wireless receiver is located on a stationary portion of the drilling rig and can be operably coupled with the surface computer via network cabling, such as an ethernet connection. While systems herein are described as including wireless transmitters and wireless receivers, this terminology is used for convenience and to imply transmission of data from downhole to the surface. According to embodiments herein, the wireless transmitter may have capability to receive data transmissions and the wireless receiver may have capability to transmit data.

Electrical noise from the drilling rig environment can interfere with transmission of RF signals in the vicinity of the drill string. For example, drive systems such as a top drive unit or table drive unit generate electromagnetic noise, as do various other components and processes associated with the drilling operation, including the downhole tools from which data related to the drilling operation are received. Other sources of noise associated with the drilling rig environment can include, but are not limited to, for example, internal combustion engines, generators, industrial controls and electronics, lighting, mud pumps, computers, consumer electronics used in the vicinity of the rig, other electronic and electromechanical devices, and/or other sources endemic or non-endemic to the rig environment. The arrangement of the wireless transmitter within the housing can shield the wireless transmitter from these noise sources and contribute to maintaining signal integrity from the wireless transmitter to the wireless receiver as well as avoid surface cabling which can act as an antenna to noise sources. Additionally, use of a beam steering antenna can generate multiple pathways along which RF signals can propagate from the wireless transmitter to the wireless receiver. In some embodiments, one or more of the multiple pathways the RF signals travel can include reflections on one or more surfaces of the drilling rig. In other words, signals from the wireless transmitter can be reflected on various surfaces of the drilling rig before being received by the wireless receiver. While not wishing to be bound by any particular theory, the inventors believe such multiple path propagation, including reflections, can facilitate data transmission from the wireless transmitter to the wireless receiver in spite of the wireless transmitter being mounted to the rotating drill string.

Figure 1:
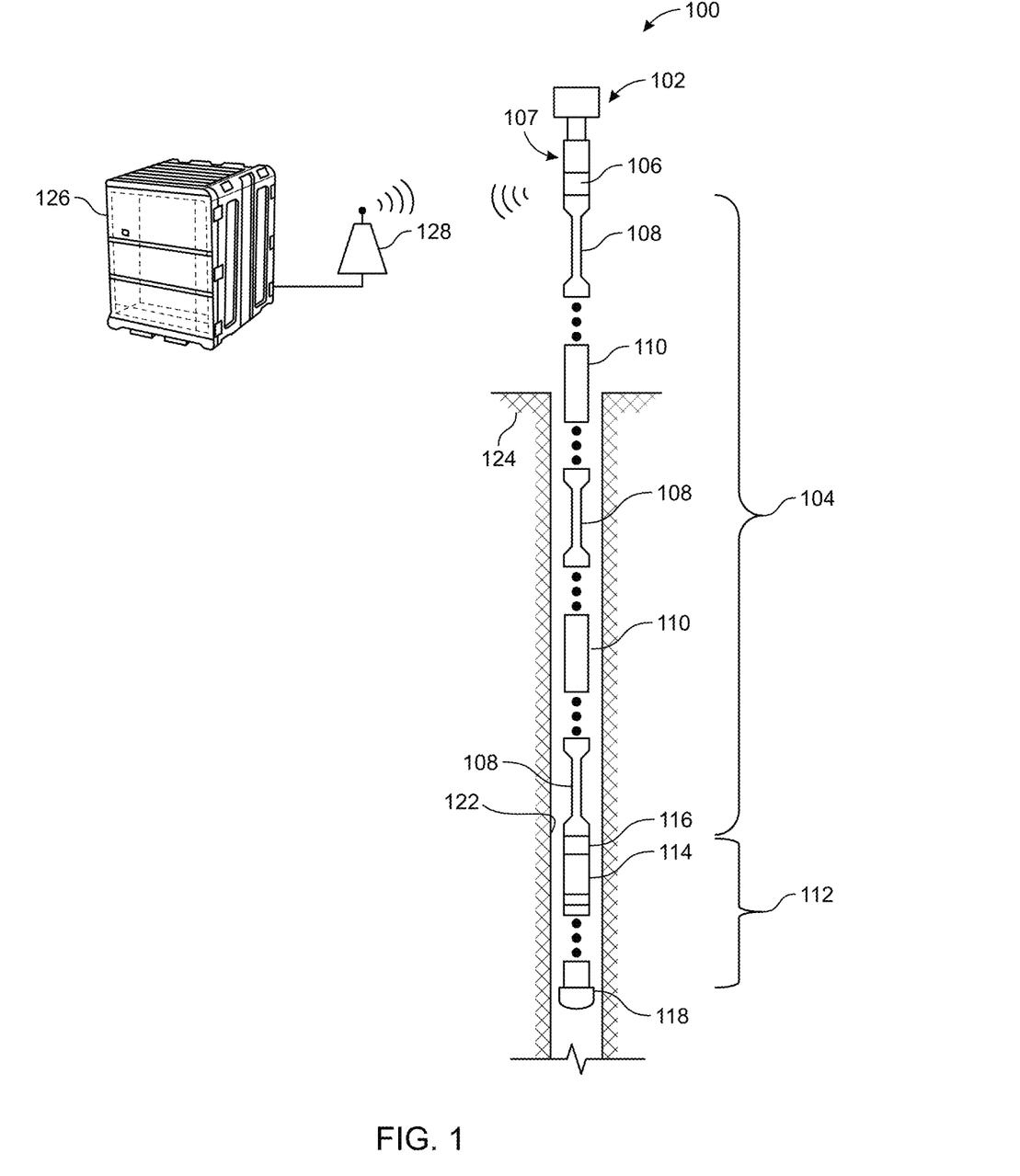
FIG. 1 is a schematic view of a well bore drilling system according to an embodiment of the present disclosure.

Referring now to FIG. 1, a schematic view of a wellbore drilling system 100 is shown according to various embodiments of the present disclosure. The well bore drilling system 100 is depicted in exploded form and comprises a top drive unit 102 connected to a drill string 104. In some embodiments, the top drive unit 102 may be connected to the drill string 104 by a saver sub assembly 106. The drill string 104 is a wired drill string and comprises a plurality of drill pipe sections 108, each carrying signal transmission lines. In some embodiments, consecutive drill pipe sections 108 are connected to each other by repeater subs 110, each including a communication link to receive and amplify, filter, modulate, or otherwise manipulate data transmitted through the drill string 104. Depending on various factors, such as the overall length of the drill string and the electrical characteristics of the data signal, repeater subs 110 may be optional and may be omitted between one or more sections 108 of the drill string 104.

A bottom-hole assembly 112 (BHA) may be coupled to the drill string 104 at or near a downhole end portion of the drill string 104 (with downhole referring to a direction of drilling and uphole referring to the direction toward the surface). The bottom-hole assembly 112 may comprise various components, depending on the particular drilling operation to be performed. A non-limiting example of such a component includes a drill bit 118 and a sensor assembly 114 that may include one or both of a measurement-while drilling system (MWD) and a logging-while-drilling (LWD) system and/or other sensors. The sensor assembly 114 may be connected to the drill pipe section 108 of the drill string 104 that is closest to the BHA 112 by an interface sub 116. The drill bit 118 may be rotated, e.g., by rotation of the top drive unit 102 and drill string 104, to form a wellbore 122 in a subterranean formation 124. As would be apparent to one having ordinary skill in the art, additional and/or alternative components can be used in constructing the drill string 104 depending on the environment and operational parameters related to drilling the wellbore 122, such as, for example, direction and inclination of drilling, pressure, temperature, porosity, permeability, resistivity, density, hydrogen or other elemental content, etc. For example, and without limitation, stabilizers, jars, reamers, downhole motors, and other drilling related tools may be used.

Signals may be transmitted or otherwise communicated along the drill pipe sections 108 and may be collected and amplified at each repeater sub 110. For example, sensor measurements from the sensor assembly 114 may be encoded and transferred along the drill string 104 via the interface sub 116. According to various embodiments of the present disclosure, the saver sub 106 can be operably coupled to the wired drill string 104 such that data from the wired drill string 104 is received by communication components housed in the saver sub 106. Alternatively, the present disclosure contemplates housing communication components in other portions of the drilling string or components attached to the drill string, such as a clamp-on housing affixed to the saver sub 106 or other portions of the drill string such as a blowout preventer (BOP) 107. For example, and as discussed in greater detail herein, the saver sub 106 (or a housing affixed thereto, to the BOP 107, or other portion of the drill string 104) can house an RF transmission system including a wireless transmitter (such as a wireless transceiver), a communication link configured to receive data from the wired drill string 104, and optionally, a processing component such as a data converter configured to receive data from the communication link, convert the data to a format suitable for transmission via ethernet protocols, and transmit the converted data to the wireless transmitter.

The wireless transmitter housed in the saver sub 106 can transmit the data to a wireless receiver 128 at a location proximate the well bore drilling system 100, such as a stationary location on a portion of a structure of the well bore drilling system 100. The wireless receiver 128 can then transmit the data to a control system 126 located at the surface, which may be or include a network controller operably coupled to a network of one or more computers configured to receive, record, decode, analyze, display, etc. the data collected from the sensor assembly 114.

Figure 2:
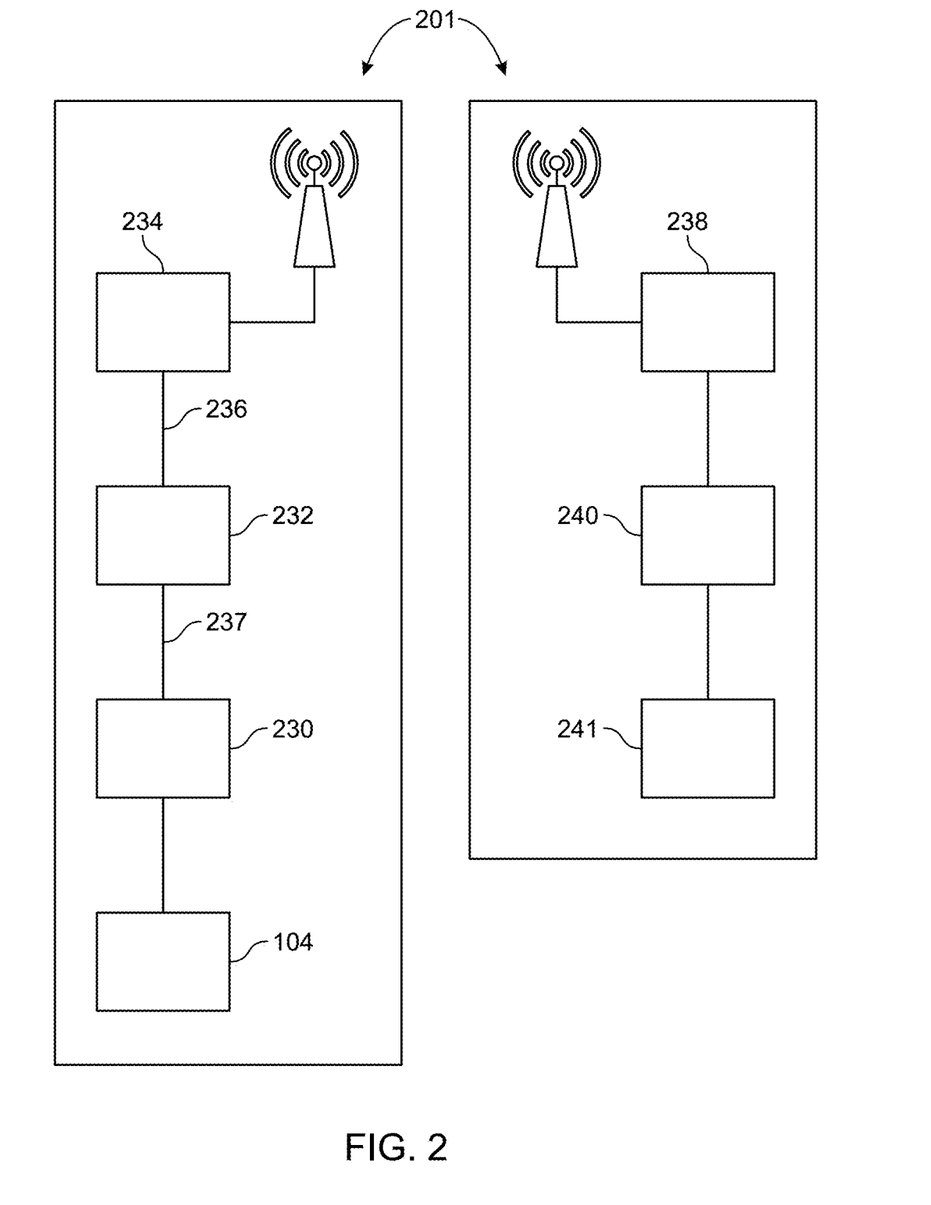
FIG. 2 is a schematic block diagram of a wireless data transmission system according to an embodiment of the present disclosure.

Various aspects of the architecture of the electronics housed in the saver sub 106 can be configured to reduce noise injection from the wireless transmitter into the wired drill string and to reduce noise injection from components of the wellbore drilling system, such as top drive unit 102, into the circuitry of the wireless transmitter. Referring now to FIG. 2, a schematic diagram of electronic components of a wireless transmission system 201 for transmitting data from a wired drill string transmission line to a surface computer of a well system is shown. A wired drill string 104 is operably coupled to a communication link 230. The communication link 230 can include hardware (such as one or more processors) and software configured to receive, amplify, filter, decode, encode, or otherwise manipulate the data received through the wired drill string.

Communication links according to the present disclosure can include those disclosed in, for example, U.S. Pat. No. 7,224,288, (filed Jul. 2, 2003) titled "LINK MODULE FOR A DOWNHOLE DRILLING NETWORK," and U.S. Pat. No. 7,139,218, (filed Aug. 3, 2004) titled "DISTRIBUTED DOWNHOLE DRILLING NETWORK," the entire contents of both of which are incorporated by reference herein.

The communication link 230 is optionally coupled to a data converter 232 interposed between the communication link 230 and a wireless transmitter 234. In some embodiments, the data converter 232 can be in the form of a single-board computer, though such an embodiment is non-limiting. The data converter 232 can be provided with software that enables the data converter 232 to receive data from the communication link 230 and convert the data from the communication link such that it can be transmitted to the wireless transmitter via a standardized communication protocol, such as ethernet or another standardized communications protocol. In some embodiments, the data converter 232 comprises hardware architecture that reduces noise injection from the wireless transmitter to through the data converter 232 and into the communication link 230. For example, in some embodiments, the data converter 232 can include an ethernet port that is electrically isolated from a main processer of the data converter 232. As non-limiting example, the data converter 232 can comprise a primary processor and a separate microcontroller connected to the ethernet port. This arrangement may isolate the primary processor of the data converter 232, and other components coupled to the data converter such as the communication link 230 and wired drill string 104 (FIG. 1) from noise generated by or received by the wireless transmitter 234.

The primary processor of the data converter 232 can be directly connected to a microcontroller of the communication link 230 via a communications protocol such as a universal asynchronous receiver-transmitter (UART) link 237. Alternatively or additionally, other communications protocols such as serial peripheral interface (SPI), inter-integrated circuit (I2C), controller area network (CAN), or any other communications protocol that facilitates direct communication between microprocessors. Such a connection arrangement (i.e., communication protocols that establish a direct connection between the microprocessors) can further reduce potential for noise injection from the wireless transmitter 234 to the data converter 232 and communication link 230.

The wireless transmitter 234 is configured to receive the data from the data converter 232 via a wired connection, such as an ethernet cable 236. The wireless transmitter 234 is configured to transmit the data received from the data converter 232 via RF signals to a wireless receiver 238 at a stationary location of the well system, such as a drill rig structure. In some embodiments, the wireless transmitter 234 can comprise one or more antennas configured with dynamic beam steering capabilities, such as a beam steering antenna array. Because the wireless transmitter 234 constantly rotates with the saver sub 106 (FIG. 1) and drill string 104 (FIG. 1) to which the saver sub 106 is coupled, while the wireless receiver 238 remains stationary, the dynamic beam steering capability of the wireless transmitter 234 facilitates consistent communication between the wireless transmitter 234 despite the continually changing spatial relationship and orientation between the wireless transmitter 234 and the wireless receiver 238. A nonlimiting example of a commercially available wireless transmitter that includes beam steering capabilities that may be used with various embodiments of the present disclosure is the Loco5AC available from UBIQUITI®, 685 Third Avenue, New York, NY 10017.

While referred to herein as a wireless receiver, the wireless receiver 238 can be or include a transceiver having both receiving and transmitting capabilities. The wireless receiver 238 can be operably coupled to a computer system 240 located at the surface, such as a network controller of the well bore drilling system 100 (FIG. 1), e.g., via a standardized communications protocol such as ethernet. The computer system 240 can optionally be coupled to a network of one or more computers 241 (e.g., via a wired network, a wireless network such as Wi-Fi or satellite communications, etc.) configured to receive, record, decode, analyze, display, etc. the data collected from the wired drill string 104. For example, the network controller can be configured to transmit data to various end users, including rig operators and other entities associated with operation of the wellbore drilling system for viewing, further analysis, etc.

In some embodiments, the electronic components that are directly coupled to the wired drill string 104. That is, the communication link 230, data converter 232, and wireless transmitter 234 are housed in a portion of the drill string 104, or in a subcomponent coupled to the drill string 104, at a location above the surface. For example, in some embodiments disclosed herein, the communication link 230, data converter 232, and wireless transmitter 234 are housed in a saver sub, such as saver sub 106 (FIG. 1) coupled between the top drive unit 102 (FIG. 1) and the wired drill string 104. In addition, the saver sub can include a power supply, such as one or more batteries or battery staves, to power the electronic components. In other embodiments, the electronic components can be housed in one or more removable housing portions such as one or more housings affixed to a portion of the drill string such as the saver sub 106, a portion of the top drive unit 102, the BOP 107, or other component.

Figure 3:
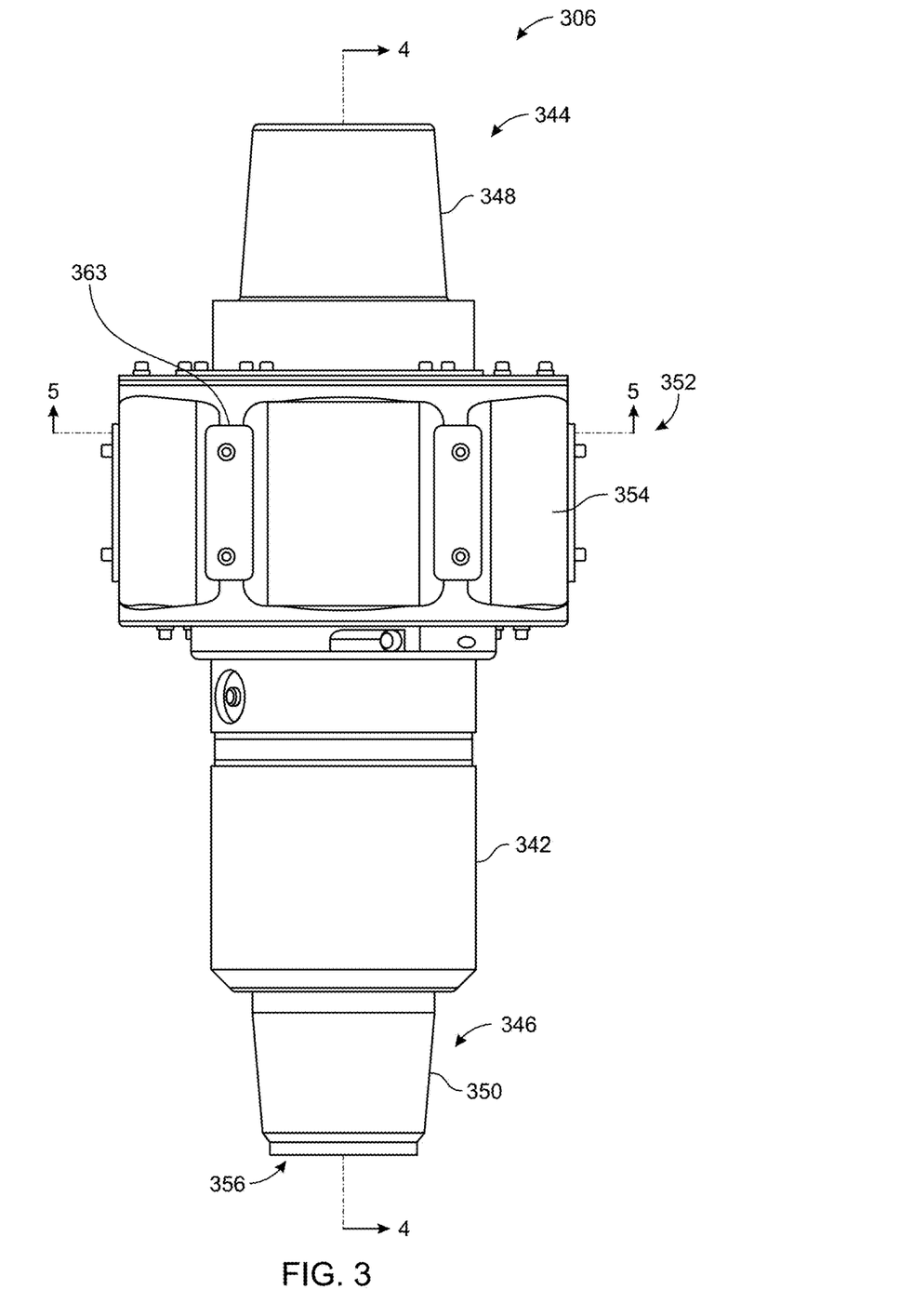
FIG. 3 is a side view of a saver sub according to an embodiment of the present disclosure.

Referring now to FIG. 3, an embodiment of the wireless transmission system in which the electronic components are housed in a saver sub 306, which can be used as the saver sub 106 of wellbore drilling system 100, is shown. The saver sub 306 can be configured similarly to the saver sub 26 disclosed in U.S. Pat. No. 8,899,347 (filed Mar. 4, 2009), the entire contents of which are incorporated by reference herein. The saver sub 306 can be configured to support the entire weight and torque load applied to the drill string 104 (FIG. 1) during a drilling operation. The saver sub 306 includes a mandrel body 342 having an upper connection end 344 and a lower connection end 346. The upper connection end 344 includes a threaded region 348 configured for threaded engagement with a top drive (e.g., top drive unit 102 shown in FIG. 1). The lower connection end 346 includes a threaded region 350 configured for threaded engagement with a drill string, such as drill string 104. The lower connection end 346 can also include a communications coupler 356 (also shown in FIG. 4) configured for communicative coupling with a corresponding communications coupler in the upper end of the drill string 104. As noted above, the communications couplers can comprise direct or galvanic contacts, inductive couplers, current couplers, optical couplers, or other types of communications couplers.

The saver sub 306 includes a housing portion 352 with one or more receptacles 354 accessible from an exterior surface of the housing portion 352. The one or more receptacles are configured to receive and house components of the wireless transmission system. For example, each of the communication link 230, the data converter 232, and the wireless transmitter 234, all shown in FIG. 2, can be housed within receptacles 354 of the saver sub 306. In some exemplary embodiments, each of the communication link 230, the data converter 232, and the wireless transmitter 234 can be housed in a respective, individual receptacle 354, and can be interconnected via electrical wiring within the housing portion 352. For example, and without limitation, the communications coupler 356 can be operably coupled to the communication link 230 via a data transmission line (not shown), the communication link 230 can be operably coupled to the data converter 232 via a wiring bus configured for UART communication, and the data converter 232 can be operably coupled to the wireless transmitter 234 via an ethernet cable. Other conductive electrical arrangements, fiber optics, and other types of interconnections are considered within the scope of the disclosure.

Figure 4A:
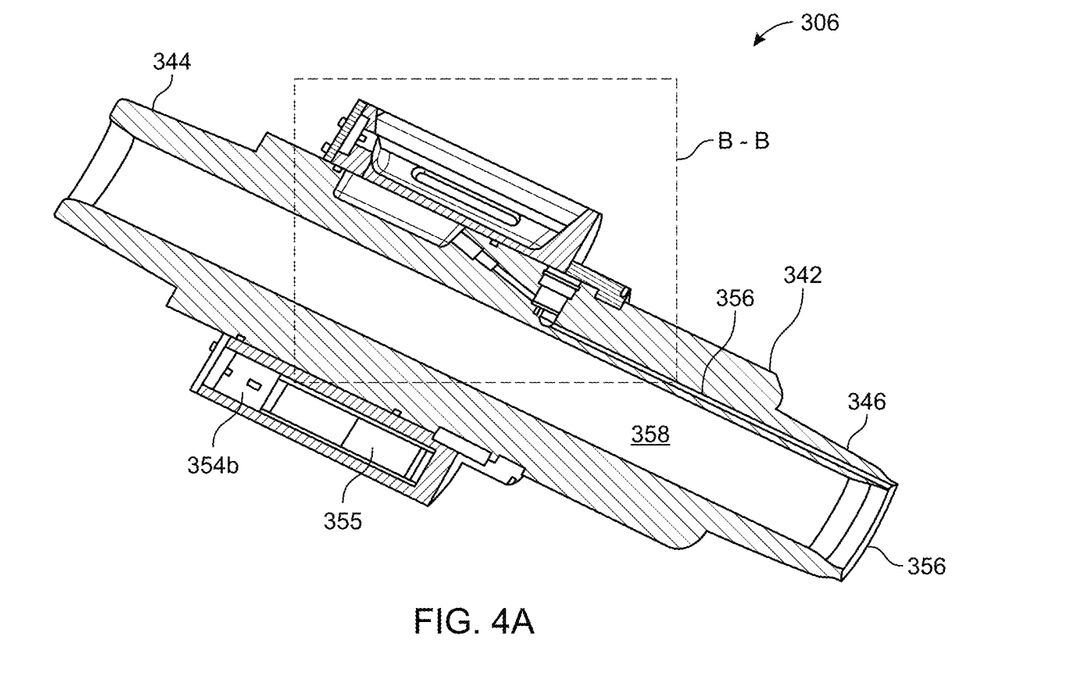
FIG. 4A is a perspective, partial cross-sectional view of the saver sub according to FIG. 3 taken along section 4-4.
Figure 4B:
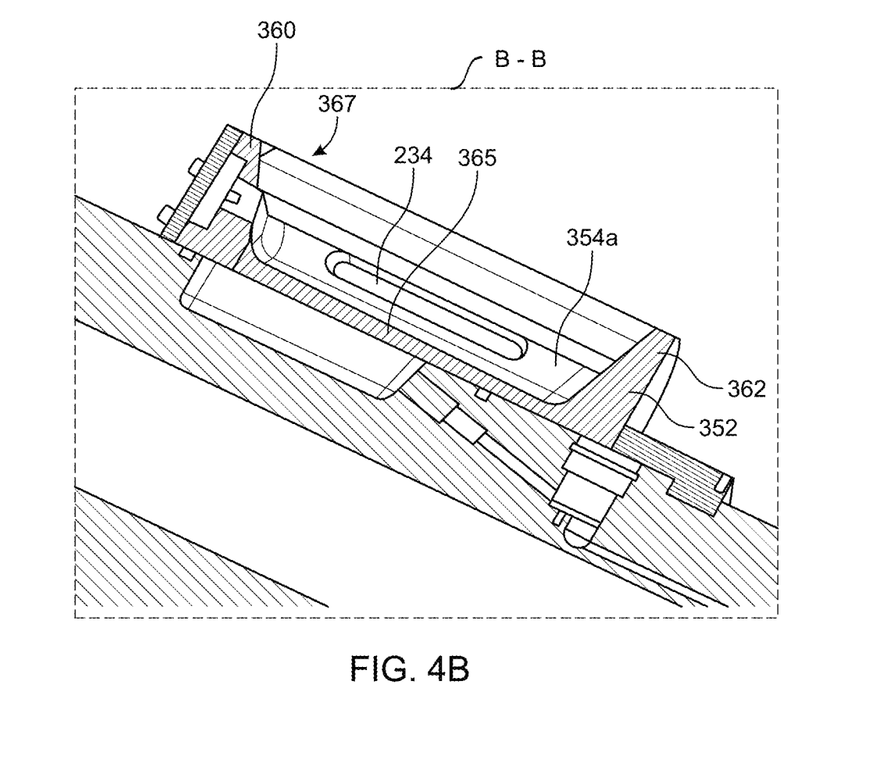
FIG. 4B is an enlarged view of portion B-B of FIG. 4A.

Referring now to FIGS. 4A and 4B, cross-sectional views of the saver sub 306 along line 4-4 in FIG. 3 is shown, with the portion indicated B-B in FIG. 4A enlarged in FIG. 4B. The mandrel body 342 comprises an internal flow passage 358 extending through the mandrel body from the upper connection end 344 to the lower connection end 346. Also shown in the drawing of FIG. 4 are receptacles 354A and 354B. Receptacle 354A is configured to house the wireless transmitter 234, and receptacle 354B is configured to house one or more batteries 355 to power the electrical components of the wireless transmission system. Receptacle 354A is configured such that the surrounding portions of the housing 352 provide electromagnetic shielding around at least a portion of the wireless transmitter 234, such as on one or more sides of the wireless transmitter 234. In some embodiments of the present disclosure, the housing portion 352 can provide shielding around all but a portion of the wireless transmitter 234 facing generally radially outwardly from the saver sub 306. For example, the housing 352 can comprise an electrically conductive material and can act as a Faraday cage to shield the interior of the receptacles 354A and/or 354B at least partially from electromagnetic radiation. In some embodiments, the housing 352 may be machined, cast, forged, sintered, or otherwise formed from electrically conductive material, and may provide the electromagnetic shielding by virtue of its construction from a conductive material. In other embodiments, the housing 352 may be formed of a non-conductive or partially conductive material and may have a layer of conductive material applied to the interior of the receptacles 354A and/or 354B, such as conductive paint, foil, or other coating. In some embodiments, the housing 352, or a portion thereof, may comprise a metal such as aluminum or titanium alloys, stainless steel, or other metals and metal alloys.

In the embodiment of FIGS. 4A and 4B, the receptacle 354A includes closed upper end portion 360 and lower end portion 362 that provide shielding for the wireless transmitter 234 for noise generally from a direction parallel a longitudinal axis AL of the saver sub 306. For example, the shielding provided by upper end portion 360 and lower end portion 362 can isolate the wireless transmitter 234 from electrical noise generated by the top drive unit 102 located uphole relative to the wireless transmitter 234 and electrical noise from the wired drill string 104 and drilling equipment located downhole relative to the wireless transmitter 234. Additionally, a closed, radially interior face 365 (face that abuts against the mandrel body 342) of the receptacle 354A can shield the wireless transmitter 234 from noise generated by other electrical components of the wireless transmission system, such as the communication link 230, data converter 232, batteries, or other components. The receptacle 354A comprises an open, radially exterior located face 367 opposite the closed interior end face 365 and facing radially away from the saver sub 306. This open face 367 permits access to the interior of the receptacle 354A from outside the saver sub 306.

A closed sidewall portion 363 can extend around a perimeter of the receptacle 354A so as to shield it circumferentially from remaining receptacles (e.g., 354B) and their contents of the housing portion 352. While the general structure of the receptacle 354A has been discussed, remaining receptacles of the housing 352, such as receptacle 354B, can have a similar configuration. The mandrel body 342 and/or the housing 352 can also be provided with various cavities and/or passages 357 to facilitate routing data lines from a communications coupler 356 to the communication link 230 (FIG. 2).

Figure 5:
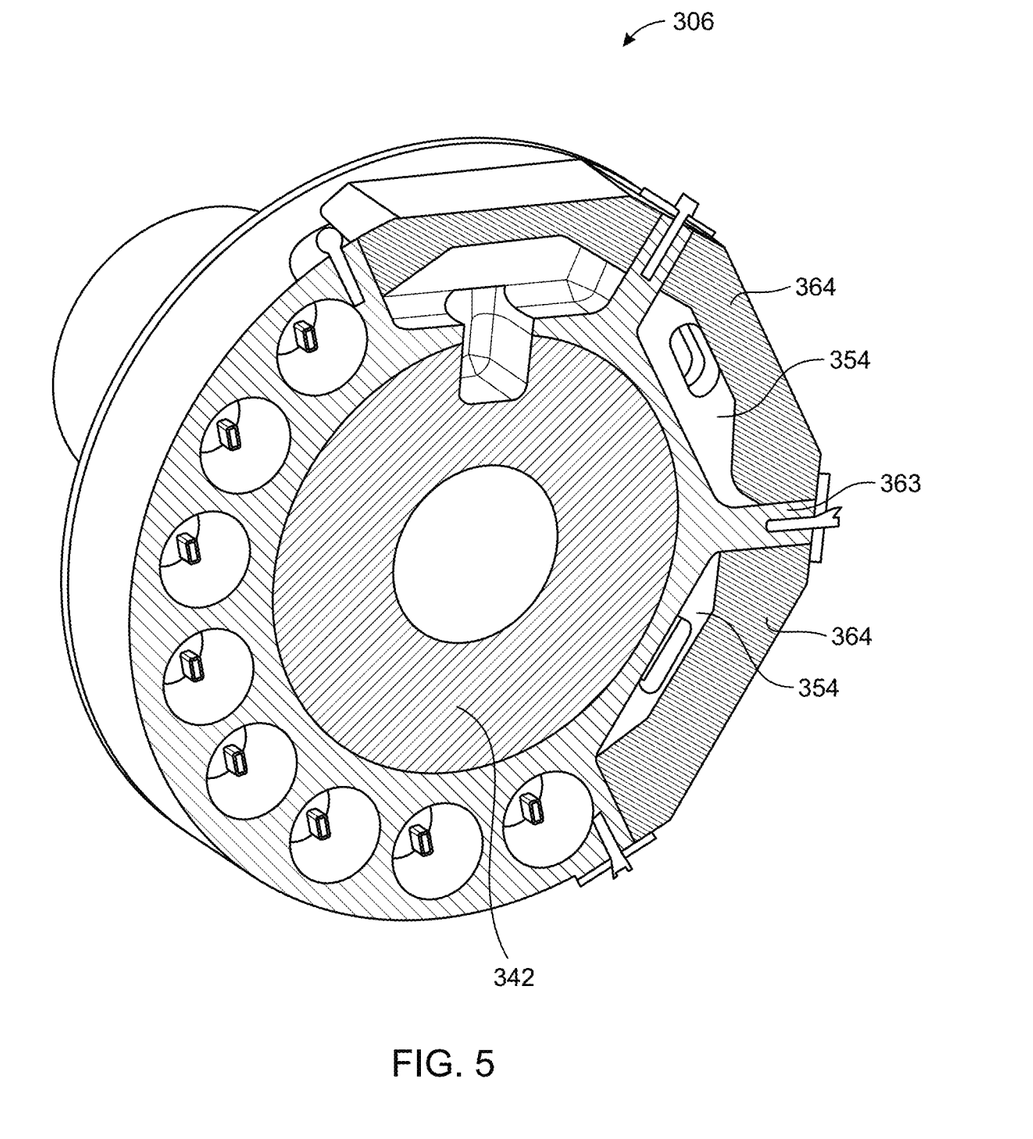
FIG. 5 is a perspective, partial cross-sectional view of the saver sub according to FIG. 3 along section 5-5.

Referring now to FIG. 5, which shows a cross-sectional view of the saver sub 306 along section 5-5 of FIG. 3, receptacles 354 can be divided by sidewall portions 363 of the housing 352 that circumferentially divide each receptacle 354 from an adjacent receptacle 354. The open face (e.g., 367 illustrated in FIG. 4) of each of the receptacles 354 can also have a cover 364 removably mounted thereover and configured to provide sealing and protections of the electronic components mounted inside and prevent intrusion of debris around the electronic components. One or more of the covers 364 can comprise a non-conductive material, such as a polymer. For example, a cover 364 associated with the receptacle 354A in which the wireless transmitter 234 (FIG. 2) is housed can comprise a non-conductive material so that the wireless transmitter 234 has an unshielded "window" facing radially outward from the saver sub 306 through which RF signals can pass. That is, the non-conductive material does not function as a faraday cage, and thus does not shield the wireless transmitter 234 in the same manner of as the housing 352. Other receptacles, such as 354B, may include a similar cover, or may include a conductive cover to provide uniform RF shielding around substantially the entirety of the receptacle.

In some embodiments of the disclosure, the housing 352 is removable from the mandrel body 342. As used in some drilling operations, the saver sub 306 is a sacrificial component. For example, repeated connections and disconnections of the drill string 104 from the lower connection end 346 of the saver sub 306 while adding sections of drill pipe 108 during drilling and/or tripping of the drill string 104 can cause wear on the lower connection end 346. The saver sub 306 prevents such wear from occurring on the much more costly and difficult to replace components of the top drive unit 102 (FIG. 1). Configuring the housing 352 to be removable from the mandrel body 342 can enable the electronic components of the wireless transmission system to be quickly removed from one saver sub mandrel (e.g., an older or worn saver sub mandrel) and reinstalled on another saver sub mandrel (e.g., a newer saver sub mandrel). In the embodiment of FIG. 4, the housing 352 is coupled to the mandrel body by a retaining member 359.

Figure 9:
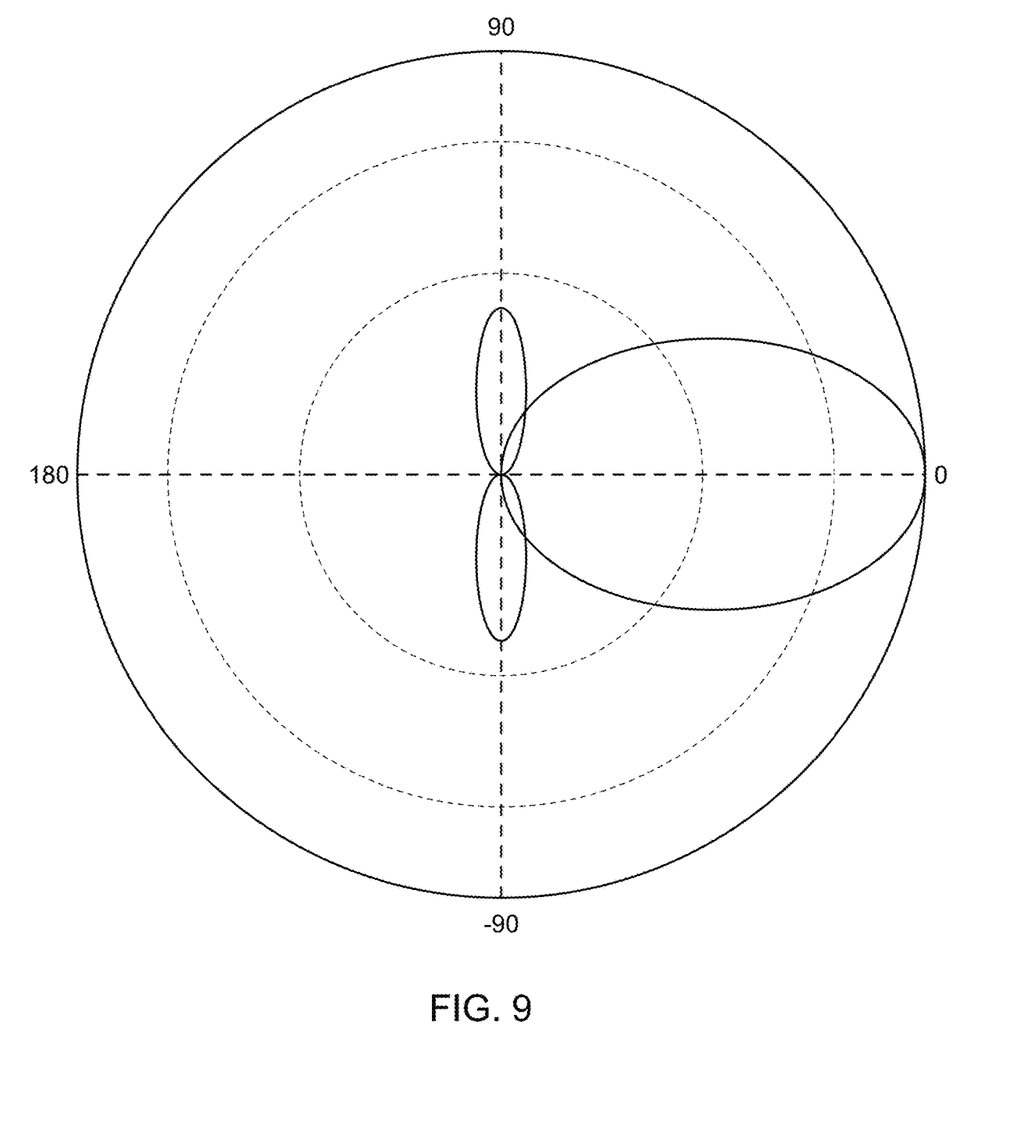
FIG. 9 is a horizontal azimuth view of a radiation pattern of a wireless transmitter according to an embodiment of the disclosure.

As noted above, in various embodiments the wireless transmitter 234 comprises an antenna or antenna array capable of beam steering. As used herein, the term "beam steering" can include dynamically changing an RF radiation pattern from the antenna based on, for example, feedback regarding operational conditions such as signal strength and signal integrity. In some embodiments, the radiation pattern from the antenna may be directed generally radially outwardly from the saver sub 306 and through the cover 364 protecting the wireless transmitter 234. Additionally, the housing 352 itself may impact the RF radiation pattern by the shielding that it provides to the wireless transmitter 234 from outside noise sources. For example, the RF signal may radiate generally radially outward from the saver sub 306 with a sweep of less than +/−90 degrees, relative to the radial outward direction from the saver sub, so as to avoid transmission in directions parallel or approximately parallel to the longitudinal axis of the drill string 104. In one embodiment, the RF signal may have a sweep of approximately +/−60-80 degrees relative to the radially outward direction from the saver sub 306 (see, e.g., angle α in FIG. 6). In addition, as discussed above, reflections of the RF signal on rig structures and/or surfaces of the housing 352 of the saver sub can contribute to maintaining RF communication between the wireless transmitter 234 and the wireless receiver 238 as the saver sub 306 rotates with the drill string 104 (FIG. 1). In addition, in some embodiments, the radiation pattern of the wireless transmitter 234 can have a lobular form, e.g., the radiation pattern forms multiple lobes spaced around an axis. In some embodiments, the radiation pattern can include a primary lobe exhibiting the exemplary sweep angles discussed above, and secondary lobes extending at locations regularly spaced from the primary lobe about the axis. For example, with reference to FIG. 9, which shows a horizontal azimuth view of a radiation pattern 984 of an exemplary wireless transmitter according to an embodiment of the disclosure, the radiation pattern includes a main lobe 986 and two side lobes 988. While the side lobes 988 are shown extending generally at right angles with respect to the main lobe 986, the side lobes may extend at other angles, i.e., non-orthogonal to the main lobe 986. Further, while two side lobes 988 are shown in the embodiment of FIG. 9, the present disclosure contemplates numbers of side lobes less than or greater than two, such as one side lobe, three, four, five, or more side lobes.

Figure 6:
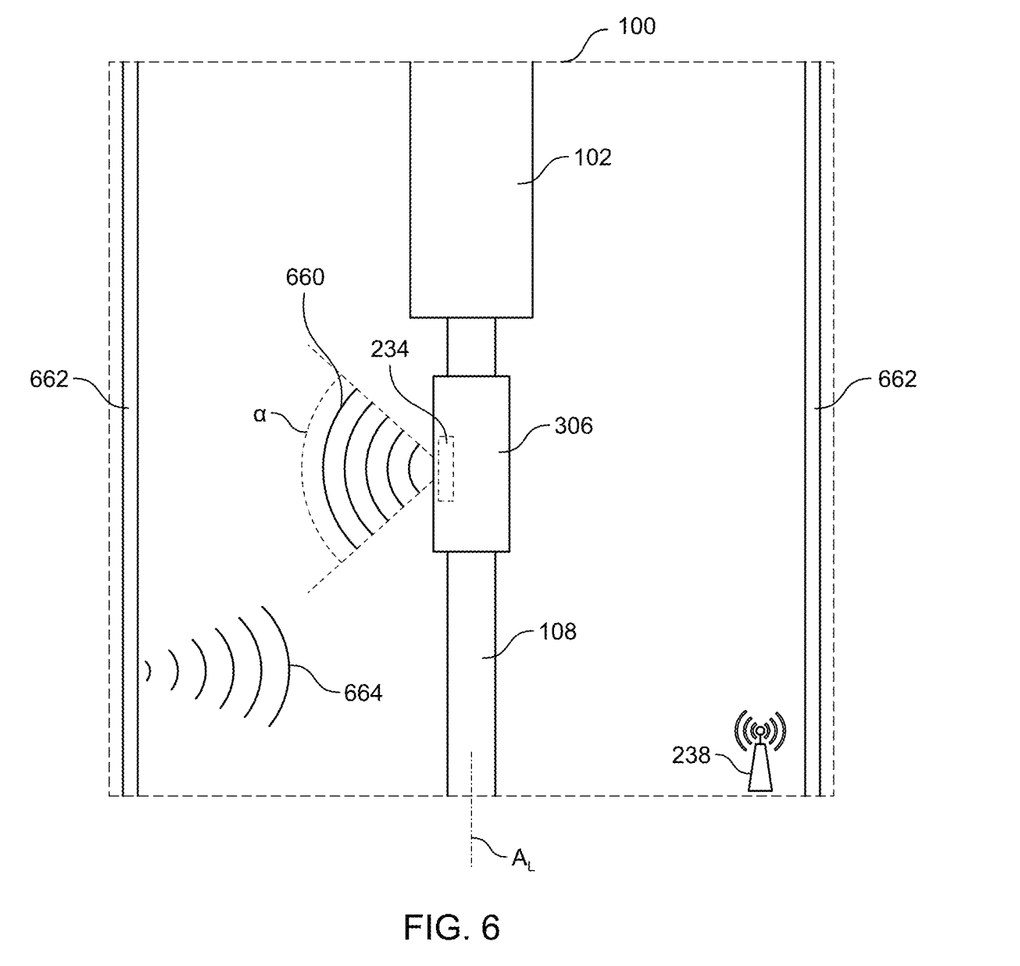
FIG. 6 is a schematic view of a portion of a well bore drilling system including a wireless data transmission system according another embodiment of the present disclosure.

Referring now to FIG. 6, a schematic illustration of embodiments of radiation patterns from the wireless transmitter 234 to the wireless receiver 238 is shown in an operational context. RF signals 660 radiate from the wireless transmitter 234 with a sweep a, which, as discussed above, may be less than 180 degrees, such as a sweep a in the range of from about +/−45 degrees to +/−75 degrees relative to the outward radial direction (i.e., perpendicular to the longitudinal axis AL of the drill string (only a portion of which including the top drive unit 102 being shown in FIG. 6), for example +/−60 degrees.

In addition to the wireless receiver 238 directly receiving RF signals 660 leaving the wireless transmitter 234, RF signals 660 leaving the wireless transmitter 234 may also reflect off rig structures, such as surfaces 662, before being received by the wireless receiver 238. Such surfaces can include, for example, structural members supporting the top drive unit 102, structural or non-structural walls, or other structural or non-structural components of the drilling system. For example, as shown in FIG. 6, reflected RF signals 664 may also ultimately be received at the wireless receiver 238. While the reflected RF signals 664 in FIG. 6 are shown as reflecting from vertical surfaces 662 of the drilling rig, RF signals may be reflected from other components of the rig structure, such as horizontal floors or ceilings, components of the top drive unit 102, components of the drill string 104, and/or portions of the saver sub 306 and associated housing (e.g., housing 352 (FIG. 3)). The combination of direct and reflected RF signals from the wireless transmitter 234 enable consistent communication between the wireless transmitter and the wireless receiver 238 despite the constant rotation of the wireless transmitter with the drill string. Further, even in the event of temporary communication interruptions between the wireless transmitter 234 and wireless receiver 238, the system can include a buffer to store information and re-transmit the information once communications are reestablished. For example, the wireless transmitter 234 may include a buffer to store and resend information until receiving a confirmation from the wireless receiver 238 that the information has been received. Communications between other components of the system can include buffering or resend capabilities. For example, ethernet communications protocol, such as that which may be used for communications between the data converter and the wireless transmitter, is configured to resend information until receiving confirmation the information has been received.

The wireless transmitter 234 can be configured with transmitting power sufficient to traverse the total path length (e.g., including distance traversed by reflections) from the wireless transmitter 234 to the wireless receiver 238. For example, in some embodiments, the total path length may be above 50 feet, above 100 feet, above 150 feet, or more, depending on the configuration of the drilling system and the relative locations of the wireless transmitter 234 and wireless receiver 238. Further, the sweep a of the signals leaving the wireless transmitter 234 can be chosen, e.g., based on the design of the housing 352 and the configuration of antennas associated with the wireless transmitter 234, such that the RF signals from the wireless transmitter 234 are not directed to the top drive unit 102 or down the drill string along the longitudinal axis AL, thereby avoiding the noise that may emanate from those portions of the drilling system.

The various approaches for isolating the wireless transmitter 234 and communication link 230 from noise can result in an improved signal to noise ratio as compared to a conventional arrangement in which the wired drill pipe is communicatively coupled with the surface computer via surface cabling. The improved signal to noise ratio can reduce the need for fault detection at the surface computer (e.g., network controller). For example, in some embodiments, the wireless data transmission systems described herein may eliminate the need for a network analyzer (e.g., vector network analyzer "VNA") coupled to the network controller and otherwise simplify system implementation.

Figure 7:
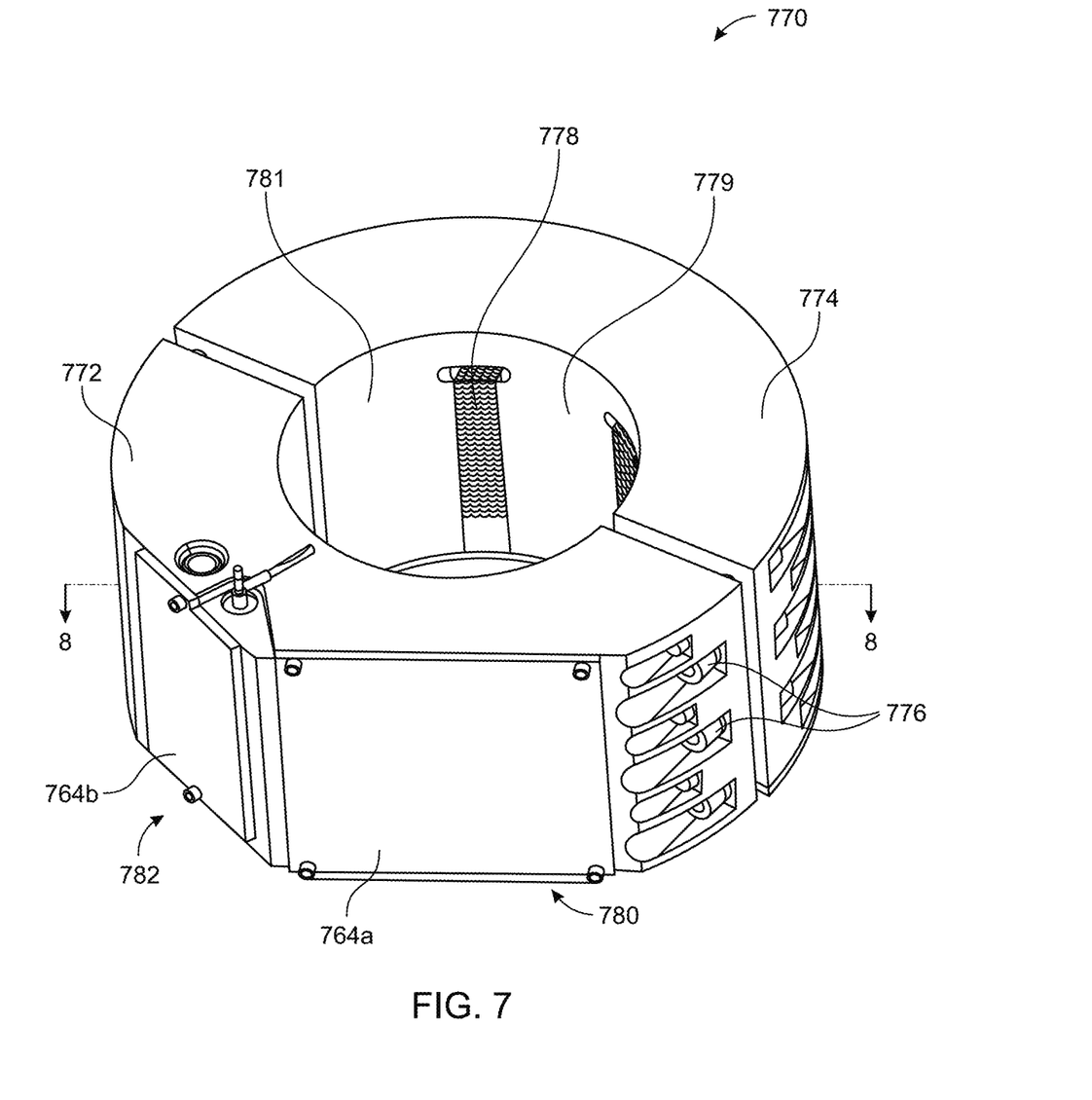
FIG. 7 is a perspective view of a housing and wireless data transmission system according to another embodiment of the disclosure.

Referring now to FIG. 7, an embodiment of a clamp-on housing 770 configured to house electronic components of a wireless transmission system is shown. The housing 770 can be configured to be removably coupled to a saver sub, such as saver sub 106 (FIG. 1), a BOP such as BOP 107 (FIG. 1), or other rotating component of the drill string 104 (FIG. 1). The housing 770 can have a configuration that facilitates removal and replacement of the housing 770 on the rotating component of a drill string, such as the drill string 104. For example, in the embodiment of FIG. 7, the housing 770 comprises a split collar design comprising a first portion 772 and second portion 774 configured to be coupled together (e.g., clamped together) around the BOP, a saver sub mandrel, or other rotating component of a drill string. In the embodiment of FIG. 7, the first portion 772 and second portion 774 are coupled via socket-head bolts 776, the number and configuration of which may be chosen based on the size of the housing 770 and overall configuration of the housing 770. In the embodiment of FIG. 7, the housing 770 includes 6 bolts per side. In some embodiments, the socket head bolts 776 may be engaged with the first and second portions 772, 774 via locking washers, such as split lock washers, Belleville spring washers, or other mechanical fasteners. In one embodiment, each of the socket head bolts 776 is provided with a Nord-Lock® washer, available from Nord-Lock International AB, 211 46 Malmö, Sweden. Other types of fastener retention systems such as safety wire, chemical/adhesive thread lockers, etc. are considered within the scope of the disclosure.

Referring still to FIG. 7, the housing 770 includes one or more gripping members 778 on an interior surface 779 surrounding a bore 781 of the housing of the housing 770 to ensure the housing 770 does not slip axially or rotationally relative to the portion of the rotating component of the drill string, such as drill string 104 (FIG. 1), to which the housing 770 is coupled. The gripping members 778 may comprise a relatively hard material, such as a stainless steel alloy or tool steel alloy, compared to the material of the housing 770, which may comprise an aluminum alloy for relatively low weight and ease of manufacture. In some embodiments, the gripping members 778 may be removable from the housing 770 so that the gripping members 778 can be replaced or sharpened as they wear from repeated installations of the housing 770.

The first and second portions 772, 774 of the housing 770 can comprise one or more receptacles configured to receive electronic components. For example, in the embodiment of FIG. 7, the first portion 772 of the housing 770 includes two receptacles 780 and 782. Each of the two receptacles 780, 782 (cut away views of which are shown in FIG. 8) are provided with a cover 764 configured to protect the electronic components located in the housing from the drilling rig environment.

Figure 8:
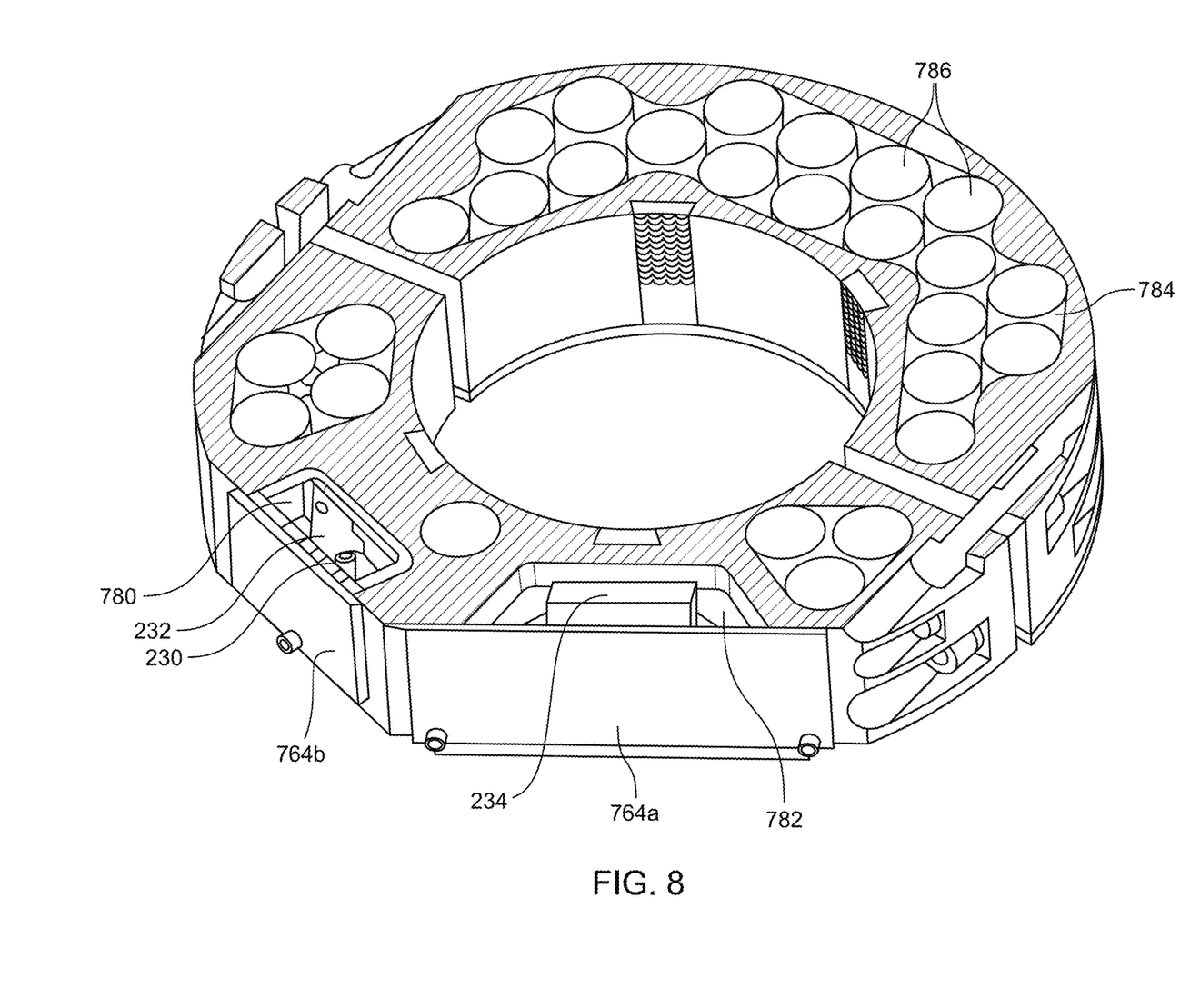
FIG. 8 is a cross-sectional view of the housing and wireless data transmission system of FIG. 7 along section 8-8.

Referring now to FIG. 8, which shows a cut-away, cross-sectional view of the housing 770 along 8-8, the first receptacle 780 houses a communication link 230 and a data converter 232, while the second receptacle 782 houses the wireless transmitter 234. Similar to the saver sub embodiment of FIGS. 3-5, the housing 770 can comprise a conductive material and can form a partial faraday cage around the wireless transmitter 234 to shield the wireless transmitter 234 from sources of noise, as discussed above. The cover 764A over receptacle 782 can comprise a non-conductive material, thereby providing a "window" through which signals from the wireless transmitter 234 can propagate. The cover 764B over receptacle 780 can optionally comprise a conductive material to provide continuous shielding around the communication link 230 and the data converter 232.

Housing 770 also includes one or more battery receptacles 784, each of which can include one or more battery cells 786 to provide power to the electronic components located in the housing 770. Each battery cell 786 can be individually isolated with a battery isolator, or groups of battery cells 786 may be isolated from other groups of battery cells 786. In some embodiments, battery banks may be modularized in additional housings. For example, the housing 770 may include the electronic components, while the battery cells 786 may be housed in one or more separate housings configured to be mounted to the drill string, such as drill string 104 (FIG. 1), adjacent to housing 770 and coupled to the electronic components in the housing 770 via power supply cables or other electrical interconnects.

Embodiments of the present disclosure can provide reliable and consistent communication between a wired drill string and a surface computer (e.g., network controller). Such embodiments can simplify implementation of the overall drilling system, provide higher quality and/or faster data transmission, and reduce data transmission problems resulting from improper installation, mechanical issues with swivel components, and other issues.

This description and the accompanying drawings that illustrate various embodiments should not be taken as limiting. Various mechanical, compositional, structural, electrical, and operational changes may be made without departing from the scope of this description and the invention as claimed, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to another embodiment, the element may nevertheless be claimed as included in the other embodiment.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further, this description's terminology is not intended to limit the invention. For example, spatially relative terms—such as "beneath", "below", "lower", "above", "upper", and the like—may be used to describe one element's or feature's relationship to another element or feature as illustrated in the figures. These spatially relative terms are intended to encompass different positions (i.e., locations) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly.

Further modifications and alternative embodiments will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

It is to be understood that the particular examples and embodiments set forth herein are non-limiting, and modifications to structure, dimensions, materials, and methodologies may be made without departing from the scope of the present teachings.

Other embodiments in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A system for communicating information about a drill string operation, the system comprising:
   a drill string comprising a bottom-hole assembly;

a data transmission line operably coupled to the bottom-hole assembly to receive data relating to the drill string operation;

a wireless transmission system operably coupled to the data transmission line and configured to receive and relay the data from the data transmission line, wherein the wireless transmission system comprises a wireless transmitter; and a housing configured to be coupled to a rotating component of the drill string, the housing being configured to receive the wireless transmitter and to provide electromagnetic shielding around at least a portion of the wireless transmitter, wherein the electromagnetic shielding is electrically insulative to transmission of electromagnetic noise associated with the drill string operation.

2. The system of claim 1, wherein the wireless transmission system further comprises a communication link operably coupled to the data transmission line and configured to manipulate the data received from the data transmission line.

3. The system of claim 2, wherein the communication link is operably coupled to the wireless transmitter.

4. The system of claim 3, wherein the communication link is operably coupled to the wireless transmitter by a data converter configured to transmit the data received from the communication link to the wireless transmitter based on a standardized communication protocol.

5. The system of claim 1, wherein the drill string is coupled to a saver sub.

6. The system of claim 5, wherein the housing is coupled to the saver sub.

7. The system of claim 1, wherein the housing is configured to be removably coupled to the rotating component of the drill string.

8. The system of claim 7, wherein:
the housing comprises a clamp; and
the clamp comprises a first clamp portion and a second clamp portion configured to be clamped together around a portion of the rotating component of the drill string.

9. The system of claim 1, wherein the drill string comprises a plurality of drill string sections, each drill string section comprising a portion of a plurality of portions of the data transmission line.

10. The system of claim 9, wherein:
each drill string section of the plurality of drill string sections comprises at least one communications coupler; and
each portion of the plurality of portions of the data transmission line is operably coupled to another portion of the data transmission line by the at least one communications coupler.

11. The system of claim 1, wherein the drill string is operably coupled to a top drive configured to rotate the drill string.

12. The system of claim 1, wherein the wireless transmitter comprises one or more antennas configured with dynamic beam steering capabilities.

13. The system of claim 1, wherein the housing defines a plurality of receptacles, each receptacle of the plurality of receptacles being configured to house a component of the wireless transmitter and being enclosed at opposite end portions and along a side of said each receptacle between the housing and the rotating component of the drill string, said each receptacle having a window that is open to an exterior facing radially outwardly relative to a longitudinal axis of the drill string.

14. The system of claim 13, wherein the housing comprises an electrically conductive material that is configured to shield an interior of said each receptacle at least partially from electromagnetic radiation.

15. The system of claim 13, wherein said each receptacle includes a cover removably mounted over the window, the cover being transmissive to electromagnetic radiation.

16. The system of claim 1, wherein a portion of the housing is transmissive to electromagnetic radiation.

17. A method of transmitting data related to a drill string operation, the method comprising:
transmitting the data related to the drill string operation along a data transmission line from a bottom-hole assembly attached to a drill string;
wirelessly transmitting the data related to the drill string operation from the data transmission line to a wireless receiver via a wireless transmitter coupled to a rotating component of the drill string; and
electromagnetically shielding the wireless transmitter along one or more sides of the wireless transmitter via a housing coupled to the rotating component of the drill string and at least partially surrounding the wireless transmitter so as to provide the electromagnetic shielding around at least a portion of the wireless transmitter wherein the electromagnetically shielding electrically insulates transmission of electromagnetic noise associated with the drill string operation.

18. The method of claim 17, further comprising:
receiving at a data converter the data related to the drill string operation;
converting, via the data converter, the data received at the data converter to a standardized communication protocol; and
transmitting, from the data converter, the converted data using the standardized communication protocol to the wireless transmitter.

19. The method of claim 17, further comprising receiving the data related to the drill string operation at the wireless receiver and transmitting the data related to the drill string operation to a surface computer operably coupled to the wireless receiver.

20. The method of claim 17, further comprising rotating the drill string while wirelessly transmitting the data related to the drill string operation from the data transmission line.

21. The method of claim 17, wherein electromagnetically shielding the wireless transmitter comprises shielding the wireless transmitter at least from above and below the wireless transmitter, with respect to a longitudinal axis of the drill string, via the housing.

* * * * *